US009816061B2

(12) United States Patent
Schmailzl

(10) Patent No.: US 9,816,061 B2
(45) Date of Patent: Nov. 14, 2017

(54) METHOD FOR TREATMENT OF A HOPS PRODUCT, AND USE OF A HOPS PRODUCT

(71) Applicant: Martin Schmailzl, Vohburg (DE)

(72) Inventor: Martin Schmailzl, Vohburg (DE)

(*) Notice: Subject to any disclaimer, the term of this patent is extended or adjusted under 35 U.S.C. 154(b) by 0 days.

(21) Appl. No.: 14/906,648

(22) PCT Filed: Jun. 3, 2015

(86) PCT No.: PCT/DE2015/000266
§ 371 (c)(1),
(2) Date: Jan. 21, 2016

(87) PCT Pub. No.: WO2015/197040
PCT Pub. Date: Dec. 30, 2015

(65) Prior Publication Data

US 2016/0168519 A1 Jun. 16, 2016

Related U.S. Application Data

(60) Provisional application No. 62/077,600, filed on Nov. 10, 2014.

(30) Foreign Application Priority Data

Jun. 24, 2014 (DE) ........................ 10 2014 009 010
Nov. 10, 2014 (DE) ........................ 10 2014 016 507

(51) Int. Cl.
*C12C 3/04* (2006.01)
*C12C 3/12* (2006.01)

(52) U.S. Cl.
CPC . *C12C 3/04* (2013.01); *C12C 3/12* (2013.01)

(58) Field of Classification Search
CPC .................................. C12C 3/04; C12C 3/12
USPC ................................ 426/592, 397, 407, 600
See application file for complete search history.

(56) References Cited

U.S. PATENT DOCUMENTS 4,780,330 A 10/1988 Laws

FOREIGN PATENT DOCUMENTS

| | | | | |
|---|---|---|---|---|
| DE | 6 822 | C | | 12/1878 |
| DE | 1 442 181 | A1 | | 11/1968 |
| DE | 1 442 180 | A1 | | 12/1968 |
| DE | 16 42 588 | A1 | | 7/1971 |
| DE | 27 54 187 | A1 | | 6/1979 |
| DE | 148 643 | A1 | | 6/1981 |
| DE | 37 79 788 | T2 | | 2/1993 |
| DE | 199 05 426 | A1 | | 8/2000 |
| DE | 10 2009 031 942 | A1 | | 1/2010 |
| RU | 1158572 | A | * | 2/1996 |
| SU | 437 804 | A1 | | 7/1974 |
| SU | 437804 | A | * | 1/1975 |
| SU | 158 572 | A1 | | 5/1985 |

OTHER PUBLICATIONS

Jakob Monsterer, "Optimale Trocknung and Konditionierung von Hopfen," Jul. 1, 2006 (total of 26 pages).
German Search Report excerpt in DE 10 2014 016 507.8 dated Mar. 19, 2015.
International Search Report of PCT/DE2015/000266, dated Oct. 12, 2015.

* cited by examiner

*Primary Examiner* — Vera Stulii
(74) *Attorney, Agent, or Firm* — Collard & Roe, P.C.

(57) ABSTRACT

In a method for treating a hop product exhibiting a moisture in excess of 18% GG water content, the hop product is sterilized in an airtight container, and stored in an airtight packaging.

11 Claims, No Drawings

METHOD FOR TREATMENT OF A HOPS PRODUCT, AND USE OF A HOPS PRODUCT

CROSS REFERENCE TO RELATED APPLICATIONS

This application is the National Stage of PCT/DE2015/000266 filed on Jun. 3, 2015, which claims priority under 35 U.S.C. §119 of German Application Nos. 10 2014 009 010.8 filed on Jun. 24, 2014 and 10 2014 016 507.8 filed on Nov. 10, 2014 under 35 U.S.C. §119(e) of U.S. Provisional Application No. 62/077,600 filed on Nov. 10, 2014, the disclosures of which are incorporated by reference. The international application under PCT article 21(2) was not published in English.

The invention relates to a method for treating a hop product, which exhibits a moisture in excess of 18% GG water content.

According to Jakob Münsterer, LfL-Information, Optimal Drying and Conditioning of Hops, Bavarian Regional Office for Agriculture, Freising-Weihenstephan, 2006, hops have a water content of 84-78% at harvest time. Other sources refer to a water content of 70% or 80 to 85%. As a rule, these freshly harvested hops are dried to a water content of 9 to 10% in order to be storable. To this end, the green hops are transported in 14 to 15 m tall hop kilns via conveyor belts, and dried at a temperature of 62 to 65° C. for a period of about 6 hours. The optimal water content of the hops fresh out of the kiln lies between 9 and 10%. The inhomogeneous hops are ventilated with circulating air to balance out their varying water content, during which the moisture between the umbel stalks and umbel leaves is compensated at the same time. The objective should be to dry the hops in such a way as to already achieve the desired water content after ventilation with circulating air. The hops are then stored for several days.

Jakob Münsterer points out that, while being dried and conditioned, the umbel must not be exposed for too long to a higher ambient moisture exceeding 70% relative humidity, which the umbel is unable to discharge or absorb, since the external quality, such as color and gloss, will otherwise be negatively impacted very quickly.

A well ventilated green hop silo is proposed for storage, since condensate water formation will otherwise negatively impact the external quality, such as color and gloss. If the water can no longer be adequately removed from the stalk due to cooler temperatures, and the stalk moisture simultaneously remains at a water content in excess of 15% for a longer period of time, microbiological processes and enzymatic spoilage reactions would very quickly develop, followed by resultant heating. Already smaller moist areas in a hop ball can cause the hops to burn, and even inflame the hops.

As long as hops are still present as green hops, and at least the moisture in the area of the stalk lies at a water content in excess of 15%, the hops must always be well ventilated, since they will otherwise spoil.

For this reason, the hops should be dried down to a water content of about 10% immediately after picked, so as not to spoil.

Belt dryers are also used as an alternative to the hop kilns.

DE OS 1 442 181 proposes that green hop umbels be squeezed to remove moisture, and treated with preservatives. Treating squeezed hops with heat as proposed in the laid-open patent specification would detract from product quality. Chemical preservatives like sulfur must be avoided for health considerations, and preserving with a vacuum robs the hops of a large portion of the aromas.

As an alternative to artificial drying and sulfurization, DE OS 1 442 180 proposes that green hop umbels be mechanically comminuted, and preserved via heating or with preservatives. Unpleasant aromatic constituents in the comminuted green hops are here largely removed by heating or evacuating the comminuted hops. Therefore, care is taken to keep the hops ventilated even while being heated, so as to drive out unpleasant aromas. However, the proposed sterilization method has been unable to establish itself in practice.

As an alternative to the aforementioned methods, DD PS 148 643 proposes that the fresh green hop umbels with their natural water content be comminuted, portioned, compacted and deep-frozen immediately in an economically favorable manner after picked.

The described alternatives to drying the hop umbels have not been able to establish themselves economically, since preservatives are rejected, and driving out aromas by way of heating or a vacuum leads to a change in the hop product that is difficult to control.

For this reason, green hops are used for brewing beer during the hop harvesting time of year, and most hops are dried in different ways. The hops can then be used as dry hops for the brewing process, or be compacted into pellets, which can also be further processed into a hop extract.

DE 10 2009 031 942 A1 describes adding hop products while brewing beer, such as hop pellets, hop powder or hop extracts from the wort, the bitter substances in which are transformed into their isomerized form at the high temperatures used in boiling the wort, which substantially increases their bitterness. Bitter substances that are not dissolved and/or not isomerized are lost for the beer. They are eliminated again with the hot and cool trub, while dissolved, non-isomerized bitter substances are nearly completely precipitated again in the fermentation process due to their slight solubility at low pH values. Therefore, it is suggested that hop pellets, hop powders or hop extracts be used in a first brewing process, and that the brewing residue with the isomerized hop products of the first brewing process be used for a second brewing process.

Known from DE 37 79 788 T2 is to heat hops in a sealed vessel under a pressure, and then depressurizing them again. This hop product is packaged after the pressure is relieved. However, salts are added to the hops for this procedure, and temperatures of 120 to 160° C. arise, thereby impairing the naturalness of the hops and causing hop oils to be lost.

SU 437 804 A1 describes a method for treating hops, in which the hops are sterilized and stored in an airtight packaging. The hops are pulverized, pasteurized for 30 minutes in a water bath, and then hermetically sealed and stored for 1 to 2 years at 15 to 20° C. before used to hop the wort. During pulverization, however, the water content is kept under a moisture of 18% GG, and lowered to at least below a 60% GG water content, and the vessels are only sealed after sterilization. This initially drives out undesired hop oils during pasteurization, after which a dry, readily storable powder arises during pasteurization, which can be kept sealed for at least one year.

SU 1 158 572 A1 describes a method for preserving green hops, in which the green hops are mixed with boiling molasses in a ratio of 1:1. The osmotic pressure of the sugar here leads to a sterilization. In this method as well, then, sterilization takes place in the open followed by storage in a closed container.

The object of the invention is to further develop a generic method, so as to provide a durable hop product with the typical green hop aroma.

This object is achieved by sterilizing the hop product as an undried, freshly harvested green hop in an airtight container, and storing it in an airtight packaging.

Sterilization in an airtight container is also understood as sterilization in an instantaneous water heater, or pre-warming in an instantaneous water heater, and subsequent sterilization in another airtight container. Therefore, an airtight container is a tube or cup, which are characterized in that the entry of air, and in particular of oxygen, is minimized during sterilization.

While green hops are always treated under well ventilated conditions in prior art, so as to remove unpleasant aromatic constituents and avoid microbiological processes and enzymatic spoilage reactions, the invention proposes that the hop product be sterilized in an airtight container.

The invention is based on the knowledge that, once an airtight container is filled with the hop product, the hop product can be very rapidly sterilized, so that spoilage reactions can be avoided. Hop oils are here completely prevented from evaporating, and contact with oxygen can simultaneously be easily avoided. It has even proven unnecessary to remove unpleasant aromatic constituents in the comminuted green hops via heating or evacuation, as proposed in DE OS 1 442 181. Since the object of the invention is to evaporate neither water nor hop oils, production is more energy-efficient than alternative methods.

DE 10 2009 031 942 A1 also proposes that the hop products be kept hot and openly boiled. Certain oils that are disadvantageous for the brewing process here evaporate. However, this has proven to be superfluous, and the hops are sterilized in their own juices according to the invention, i.e., with its own residual moisture. Water is not added so as to return previously removed moisture, but rather to standardize the alpha oil quantity and pH value.

The invention is based on the knowledge that the process of obtaining the green hop aroma can be controlled in such a way as to obtain the strongly intense bitterness of the green hops. Fewer hops are required as a result, and various aromas can be amplified via the time and temperature of heat treatment. For example, preservation at 60° C. for 60 minutes results in an aroma of fruity red currants, at 90° C. for 30 minutes intensifies the typical hop aroma, at 90° C. for 60 minutes leads to a very fresh, intensive, hoppy aroma, at 60° C. for 30 minutes intensifies grapefruit notes, at 100° C. for 30 minutes, and at 90° C. for 90 minutes yields an aroma that calls to mind green olives. As a consequence, a special aroma can be intensified or generated in a targeted manner by the selection of temperature and treatment time. Therefore, the method not only serves sterilization purposes, but can also be cumulatively or alternatively used for specifically influencing the hop aroma. Gratifying here is that all phytonutrients are retained, and the aroma can be influenced by the sterilization process.

Alternatively or cumulatively, for example, the hop product can also be cold sterilized with Velcorin or gamma radiation. Additionally proposed for sterilization are ohmic heating, direct steam injection, flash pasteurization or autoclave treatment. This is advantageous in particular when the used temperatures and times are inadequate for the desired sterilization due to a specific aroma influence.

Steam injection can also be used to drive out specific fresh hop aromas, so as to arrive at a known pellet aroma.

It is advantageous for the hop product to be sterilized right after the harvest in an airtight container on the very same or ensuing day, and at the latest one week after the harvest. This prevents microbiological processes and enzymatic spoilage reactions from impairing the hop product between the harvest and sterilization.

The sterilization method according to the invention is particularly well suited for green hops, which can hence be sterilized right after the harvest, and then be available for use for a prolonged period of time, for example for brewing beer.

Even optimizing the drying method was unable to prevent a large percentage of bitter substances and aromatic substances from being lost while drying the hops. As a result of the sterilization method underlying the invention, essentially all bitter and aromatic substances of the hops are retained, thus necessitating fewer hop products while brewing beer. In addition, hop aromas that no longer exhibit dry hops can be used while brewing beer.

An advantageous embodiment variant of the method provides that the hop product be hop umbels. The hop umbels can thereby be made available as a sterilized product in their umbel form. Making available sterile hop umbels opens up new areas of application, in which year-round, natural hop umbels are required.

As an alternative, it is proposed that the hop product be comminuted hop umbels. The method then provides that freshly harvested umbel hops be comminuted prior to sterilization. As a result of sterilizing freshly harvested green hops, the water content of the green hops cools the hops, and comminution does not lead to any thermal load. To this end, for example, the hop umbels can be comminuted in a mill or mincer, thereby making a fresh hop mash available for sterilization. The hops can here also be comminuted in such a way that, after the root has been boiled, it can be separated from the root in a whirlpool.

Both when processing hop umbels and comminuted hop umbels, a container with fresh hops can be made available, which is filled with green hops that still exhibit the typical hop coloration. In particular when sterilizing comminuted hop umbels, care must be taken to only allow less than 5 hours, or preferably even less than 1 hour, to elapse between the comminution and sterilization.

The hop product can be sterilized through deep freezing, radiation sterilization, plasma sterilization or similar methods. It is particularly advantageous for the hop product to be sterilized with heat. In particular for sterilization with heat, it is advantageous for the hop product to exhibit a specific moisture. For this reason, it is advantageous for the umbels not to be dried after the harvest, and for their moisture to still be in excess of 60% GG water content during sterilization.

Depending on the sterilization method and state of the hop product, it may be advantageous to add liquid to the hop product before sterilization. For example, water is suitable as the liquid. In particular the addition of water yields a defined hop product, whose moisture and contents can be standardized. Simple sterilization and user-friendly further processing arise when the moisture of the green hops in the airtight packaging measures in excess of 50% GG water content. However, beer or wort can also be added as the liquid. But as a result, the hop aroma becomes influenced by the ingredients of the wort. Adding the liquid makes it possible to isomerize alpha acids during sterilization already.

Adding liquid makes it possible to standardize the ingredients, since higher concentrations can be diluted by the addition of liquid. Adding liquids also improves the heat transfer, and can also make the product pumpable. A hop umbel here acts as a sponge that can absorb a lot of liquid.

A simple sterilization can be achieved by keeping the airtight container at over 60° C. for at least 30 minutes. This treatment can be repeated after 12 to 24 hours, for example on the next day, so as to arrive at a good result with little energy input. It is advantageous for the heat holding time to measure under 1.3 hours, and preferably under 70 minutes. This avoids a loss of oils caused by a long heat holding time. The temperatures preferably lie between 90 and 130° C.

Good results are also obtained via tyndallization. Germ reduction is here achieved through repeated heating. As opposed to sterilization, the material to be tyndallized is not exposed to a temperature of 121° C. for 20 minutes, but to a maximum of 100° C. In one protocol mentioned only as an example, the sample is initially heated to 100° C. for 30 minutes, which kills vegetative bacterial and fungal cells, and induces the germination of heat-stable, stationary spores via heat shock. A subsequent incubation at 37° C. for 12 hours causes the stationary spores to germinate into vegetative cells. The latter can now be killed via renewed heating to 100° C. for 30 minutes. The result is a distinct reduction in germs. By repeating this or a similar heating-incubation cycle several times, the number of germs can be further reduced. As a result, an adequate sterilization can be achieved without pressure, even at boiling temperatures of around 100° C. Depending on the temperature and time selected, the same hop product can exhibit varying properties after sterilization, which are tailored to the requirements while brewing beer or in other areas of application.

It is advantageous for the airtight container to be autoclaved. The temperature and time can here be adjusted in such a way as to achieve the sterilization necessary for the duration of curing. Sterilization can take place in batches in autoclaves, or continuously in the instantaneous water heater.

It is especially advantageous for steam sterilization to take place in cans, airtight films like multilayer films, or glass packagings. For example, the sterilization material or filler is here heated at 121° C. and a pressure of 2 bar for 20 minutes in steam, or to 134° C. at 3 bar for 5 minutes. Heating to 134° C. at 3 bar for 18 minutes can also take place to destroy prions.

It is advantageous for the hop product to be shaken or made to oscillate via ultrasound during sterilization. The duration of sterilization can be shortened as a result.

Apart from essential oils, alpha acid is the most important ingredient in the hops for use in breweries. Alpha acids are responsible for the bittering of the beer. The content of alpha acid in the hops most often exceeds 10% for bitter hops, and lies below 10% for aromatic hops. Since the alpha acids are only transformed into iso-alpha acids during the boiling process, the bitterness can only be developed by boiling the hops. The longer the hops are boiled, the longer the isomerization of the alpha acids continues, and the yield of bitter substances rises. For this reason, bitter hops are usually added at the start of the wort boiling process, and aromatic hops are added at the end of the wort boiling process.

The method according to the invention makes it possible to conduct the sterilization process in such a way that at least 1 or 2%, preferably even more than 10%, of the alpha acids are already isomerized into iso-alpha acids during sterilization. As a result, the yield of bitter substances can be increased not just by avoiding a drying process, but also by virtue of the fact that a portion of alpha acids is isomerized into iso-alpha acids during sterilization already.

As a result of its natural properties and durability, a hop product manufactured in this way can thus be added to the young beer or beer after the wort has been boiled. Whole umbels or comminuted umbels can here be used, and an umbel can also only be added to the tapped or poured beer at the pub, for example, so as to impart an especially aromatic, herbal taste to the beer.

However, the hop product can also be used in the area of cosmetics as a mask, skin layer, bath or tea. It can be used as a food additive or further processed into a food additive. This makes it easier to showcase the health-relevant, sedative and preservative effect mechanisms of the hops in various areas of application.

The hop product can also be stored in alcohol or oil, so as to give it a long shelf life and keep the bitter, aromatic taste.

In a first exemplary embodiment, fresh, bitter hops comminuted in a watertight bag were initially heated in a pot with hot water at 110° under an excess pressure for 55 minutes. 3.5% alpha acid, 1.4% beta acid and 1.0% iso-alpha acid were measured thereafter. Method EBC 7.7 was used to measure the alpha acid and beta acid, while a test method according to the EBC in a non-accredited area was used for the iso-alpha acid.

In the second sample, the bitter hops were heated at 80° C. in a glass container for 90 minutes. After that, the content of alpha acid was 4.2%, that of the beta acid was 1.6%, and that of the iso-alpha acid was 0.7%.

In a third sample, a glass container with bitter hops was again heated at 70° C. for 70 minutes, after which 4.1% alpha acid, 1.4% beta acid and 0.1% iso-alpha acid were measured.

Aromatic hops were then treated accordingly. A sample was here heated at 90° C. in a bag for 90 minutes. This led to 1.6% alpha acid, 1.3% beta acid and 0.4 iso-alpha acid.

After being heated at 90° C. for 90 minutes, a sample in a glass resulted in 0.5% alpha acid, 1.1% beta acid and 0.3% iso-alpha acid.

It can already be inferred from the above that a high temperature facilitates isomerization. Already these two parameters make it easy to influence the product properties during sterilization.

The method according to the invention leads to a hop product that is sterile, and thus especially well-suited for dry hopping from a microbiological standpoint. The special, brief thermal treatment results in a fresh hop product with a corresponding aroma. While the soft resins become hard resins given a long drying treatment, the hop product according to the invention has an especially high number of soft resins. One particular advantage lies in the fact that the hop oils and polyphenols are retained, so that the special characteristics of a hop variety are not impaired by sterilization.

Depending on the intended application, the hop can be comminuted to an especially great extent, so as to be discharged in the whirlpool, or even whole umbels can be used, which are removed with a hop colander.

The lupolin glands soften during sterilization, and the predominant portion of soft resins leads to a special solubility.

For example, the pH value can be adjusted during sterilization by adding wort or water in such a way as to bring about a desired isomerization of the hop acids. Hopping is facilitated by the wet product, since it sinks in rapidly when adding water or wort, and only a brief period of contact is needed to transfer the acid and oils from the lupolin glands into the liquid. This shortens the boiling time required for dissolving the resins, and the time needed to transfer the hop aroma into the product shortens even while dry hopping.

While pre-isomerized hop products usually exhibits salts like magnesium oxide or additives like hexane methanol or methylene chloride, a pre-isomerized product can be manufactured without such additives using the method according to the invention.

Also proposed for isomerization are warming phases at 50° C. for one to two weeks, so as to obtain so-called iso-alpha pellets. This complicated type of treatment also becomes unnecessary when using the sterilization method according to the invention.

The resultant hop product can be easily individually adjusted to special requirements by the selection of liquid (wort, water), warming period and temperature, as well as the material of the packaging. Depending on the packaging selected, the storage duration can be extended from months to years.

Studies have shown that polyphenols, resins, oils and tannins are completely retained during sterilization. The bitter acids here oxidize in part into hard resin components.

The described method enables the manufacture of a hop product as a purely natural product, which exhibits only hops, water and malt, and preferably only hops and water. Malt is usually added by way of wort. The addition of other ingredients is neither necessary nor provided. Water can also be added instead of wort, and the water in the hop product can also be confined to the water introduced with the hops. Since absolutely no additives are used, a wet and green hop product can be manufactured as an ISO product.

Such a hop product is harmless from a microbiological standpoint, which also makes it suitable for dry hopping, and introduces an incomparable fresh hop aroma into the beer. This can be attributed to the fact that the hop product exhibits numerous soft resins and fewer hard resins, and the hop oils and poly phenols are retained.

The method is also suitable for other freshly harvested products, such as herbs (dill, parsley, etc.). By varying the parameters, it enables the manufacture of end products with differing aromas, and makes it easier to break down phytochemicals to increase usability.

The invention claimed is:

1. A method for treating a hop product, the method comprising steps of:

placing materials into a container, the materials consisting of the hop product and optionally water or wort, the hop product being an undried, freshly harvested green hop;

sealing the container so that the container becomes an airtight container;

sterilizing the hop product in the airtight container to form a sterilized hop product, the sterilized hop product comprising volatile hop oils; and storing the sterilized hop product in the airtight container.

2. The method according to claim 1, wherein the hop product comprises hop umbels.

3. The method according to claim 1, wherein the hop product comprises comminuted hop umbels.

4. The method according to claim 1, wherein the hop product is sterilized with heat.

5. The method according to claim 1, wherein the moisture of the hop product to be sterilized measures in excess of 60% GG water content.

6. The method according to claim 1, wherein liquid is added to the hop product before sterilization.

7. The method according to claim 1, wherein the moisture of the green hops in the airtight packaging measures in excess of 60% GG water content.

8. The method according to claim 1, wherein the airtight container is kept at in excess of 60° C. for at least 15 minutes.

9. The method according to claim 1, wherein the airtight container is autoclaved.

10. The method according to claim 1, wherein at least 1%, preferably even more than 10%, of the alpha acids isomerize into alpha acids during sterilization.

11. A method comprising steps of:

(a) placing materials into a container, the materials consisting of a hop product and optionally water or wort, the hop product being an undried, freshly harvested green hop;

(b) sealing the container so that the container becomes an airtight container;

(c) sterilizing the hop product in the airtight container to form a sterilized hop product, the sterilized hop product comprising volatile hop oils;

(d) boiling a wort; and (e) adding the hop product to young beer or beer before, while or after boiling the wort to form a beer product.

* * * * *